April 5, 1938.  A. S. LONG  2,113,452
CLEANING DEVICE
Filed Oct. 3, 1935
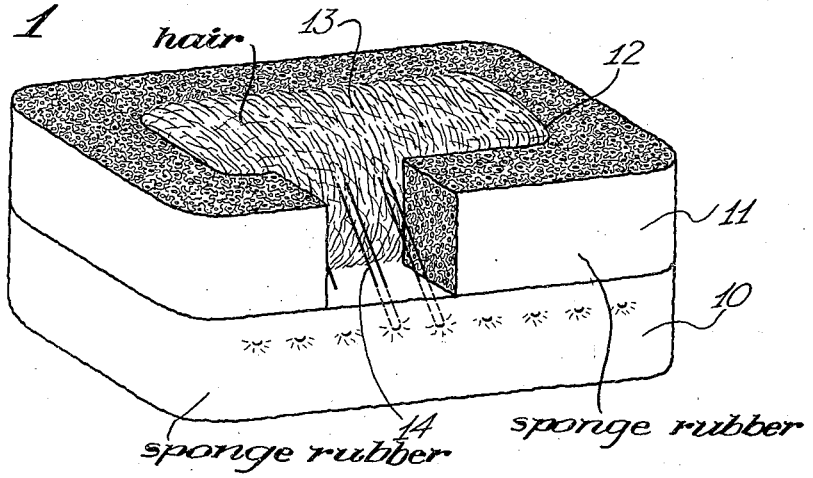
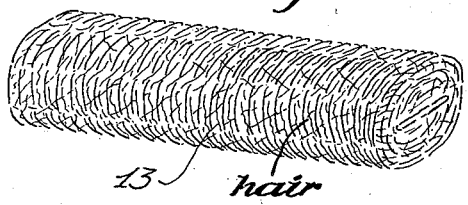
INVENTOR.
ANGUS S LONG
BY Flournoy Corey
ATTORNEY.

Patented Apr. 5, 1938

2,113,452

UNITED STATES PATENT OFFICE 2,113,452

CLEANING DEVICE

Angus S. Long, Cedar Rapids, Iowa

Application October 3, 1935, Serial No. 43,371

1 Claim. (Cl. 15—105)

This invention relates to cleaning devices and has particular relation to the structure of such devices and to means and methods of manufacturing such devices.

The removal of insects, dirt, and the like from the windshield, headlights and other parts of a motor vehicle presents a difficult problem and many different means have been proposed and utilized in meeting this problem. Various liquids have been employed which liquids are supposed to soften and dissolve the insect matter so that it may be removed by washing the windshield. This method is not entirely effective because the liquid does not accomplish its purpose. Furthermore, the operation requires two distinct steps, that is softening and dissolving the insect matter and then removing it from the windshield. Another method of securing this result is to scrape the insect matter from the windshield with a razor blade or like edged instrument and then flush the windshield with water from a sponge or the like. This method has its disadvantages in that it is quite easy to cut or scratch the windshield and windshield frame, and the method cannot be used for removing insect matter from painted and polished surfaces such as the body, fenders, lamps and the like.

It is an object of my invention to provide a device which will scrape insect matter and the like from the windshield without danger of injuring or scratching the glass or other parts of the motor vehicle and at the same time, flush the material from the windshield.

Other and further features and objects of the invention will be more apparent to those skilled in the art upon a consideration of the accompanying drawing and following specification, wherein is disclosed several exemplary embodiments of the invention, with the understanding, however, that such changes may be made therein as fall within the scope of the appended claim without departing from the spirit of the invention.

In said drawing:

Figure 1 is a view in perspective of a device constructed according to one embodiment of my invention and having a portion of the device torn away to illustrate the interior structure of the device.

Figure 2 is a view in perspective of a roll of scraping material as it appears when it is ready to be inserted in the sponge as illustrated in Figure 1.

Referring now to the drawing, a device constructed according to a preferred embodiment of my invention is comprised of two substantially rectangular superimposed layers of sponge rubber as indicated at 10 and 11, the upper layer 11 having a rectangular opening 12 therein for the reception of the wad of scraping material 13. The layers 10 and 11 are secured to each other by means of rubber cement or the like. I preferably employ sponge rubber for the layers 10 and 11 for holding flushing liquid, but other materials, such as felt or natural sponge may be employed. I have found that tightly wound animal hair is very effective for use as a scraping material 13. The scraping material 13 may be secured within the rectangular opening 12 in any desired manner as by vulcanizing it to the upper surface of layer 10 or to the sides of opening 12, or both, but a preferred construction is to sew the hair in place by stitches which pass down through the hair and at an angle to the layers 10 and 11, out through the side of the layer 10, and back through the hair, as indicated at 14.

The construction and structural arrangement of the scarping material are very important, as the material must be so disposed that it will not readily loosen from the sponge. I have found by considerable experimentation that if the hair is tightly wound in a roll or coil, it does not readily loosen and will remain in place in the sponge until it is practically worn out. In forming the coil of hair such as the coil shown in Figure 2, I preferably employ any suitable winding device known to the art.

It has been found that the selected hair has sufficient body in its tightly wound condition to act as a good scraper for scraping insect matter and the like from the windshield and other parts of the motor vehicle without scratching these parts. The sponge rubber pad will carry sufficient water to flush the insect matter from the windshield and the reverse side of the pad may be employed as a sponge for flushing the windshield or car parts. The natural oil of the hair keeps the filler soft and pliable so that it will not scratch glass or highly polished surfaces. A device so constructed is long lived and does not readily wear or disintegrate with use.

While the device here shown and described is particularly applicable for use in cleaning glass and highly polished surfaces it is quite apparent that the device will have many other uses and may be modified for various purposes. For instance, it has been found that a device constructed according to my invention but constructed in larger sizes is suitable for washing windows, scrubbing floors and other uses.

Although I have described a specific embodiment of my invention and a specific means and method of making such a device it is apparent that modifications may be made by those skilled in the art. Such modifications may be made without departing from the spirit and scope of the invention as set forth in the appended claim.

I claim as my invention:

A cleaning device comprising a moisture holding pad having an opening in one face thereof, and a scraping element secured in the opening in the pad, the scraping element being comprised of hair strands wound into a tightly coiled roll with the roll disposed in the opening with a face thereof exposed at the surface of the pad and with its axis parallel to the face of the moisture holding pad in which the opening is located, this face and the exposed portion of the roll constituting a work contacting surface.

ANGUS S. LONG.